United States Patent [19]

Fay et al.

[11] Patent Number: 5,240,397

[45] Date of Patent: Aug. 31, 1993

[54] INJECTION MOLDING MECHANISM FOR FORMING A MONOLITHIC TUBULAR PIPETTE

[75] Inventors: John E. Fay; Michael T. Faulkner, both of Leominster, Mass.

[73] Assignee: Biomedical Polymers, Inc., Leomister, Mass.

[21] Appl. No.: 882,909

[22] Filed: May 14, 1992

Related U.S. Application Data

[62] Division of Ser. No. 769,958, Oct. 1, 1991, abandoned.

[51] Int. Cl.⁵ .............................................. B29C 45/77
[52] U.S. Cl. ................................ 425/145; 264/328.11; 264/328.12; 422/100; 425/468; 425/577
[58] Field of Search ............... 425/145, 146, 147, 468, 425/577; 264/328.11, 328.12; 422/99, 100

[56] References Cited

U.S. PATENT DOCUMENTS

| | | | |
|---|---|---|---|
| 2,153,105 | 4/1939 | Szecsi | 422/100 |
| 2,301,338 | 11/1942 | Smith | 425/468 |
| 2,692,503 | 10/1954 | Crecelius | 422/100 |
| 3,441,384 | 4/1969 | Worrill | 422/100 |
| 3,512,944 | 5/1970 | Craig et al. | 422/100 |
| 3,737,272 | 6/1973 | Segmuller | 425/468 |
| 4,278,417 | 7/1981 | Wilds et al. | 425/577 |
| 4,764,103 | 8/1988 | Mitake | 425/577 |
| 5,049,344 | 9/1991 | Sorensen | 425/577 |
| 5,073,347 | 12/1991 | Garren et al. | 425/577 |

Primary Examiner—Tim Heitbrink
Attorney, Agent, or Firm—Iandiorio & Dingman

[57] ABSTRACT

The invention includes a system for producing a monolithic injection molded pipette including a mold having an elongate cavity enclosing a prolate core, both cavity and core having tapered ends, paired retractable locking pins for stabilizing the core, solonoid drives for extending and retracting the pins, a resin source for for injecting resin into the cavity, and a controller for retracting the pins as injected resin flows along the core to the space proximate the pins. The invention includes a method for making a pipette including enclosing an elongate, tapered core in a mold having a prolate, tapered cavity to accept the core, extending paired locking pins to stabilize the core, injecting resin into the cavity and sequentially retracting the locking pins as the resin flows in the cavity proximate the pins. The pipette according to this invention is an injection molded monolithic structure comprising an elongate tube and a tapered tip formed integrally with the tube.

12 Claims, 7 Drawing Sheets

INJECTION MOLDING MECHANISM FOR FORMING A MONOLITHIC TUBULAR PIPETTE

This is a division of application Ser. No. 07/769,958, filed Oct. 1, 1991 now abandoned.

FIELD OF INVENTION

This invention relates to a pipette and a method of making it and more specifically to a disposable monolithic tapered injection molded pipette.

BACKGROUND OF INVENTION

Pipettes are familiar tools in virtually all biological and chemical laboratories for the measurement of precise volumes of liquids.

The interior of a pipette must be clean and dry in order to preserve the accuracy of the volume and the content of the sample being measured. In commercial settings, the washing and drying of pipettes for reuse is generally considered too costly due to the labor and time involved. Therefore, disposable pipettes have come into popularity. Currently, such pipettes are assembled from two or three distinct parts. The principal part is a tube which is typically formed of a thermoplastic material through an extrusion process. The extruded tubing is cut into preselected lengths. Attached to a tube is a tapered tip. The tip is typically an injection molded part and is attached to the tube by means of a sonic weld or solvent seal. An optional mouthpiece may also be attached at the end of the tube opposite the tapered tip. Finally, the assembled pipette is printed with calibration marks.

Pipettes assembled according to this procedure suffer from several disadvantages. For example, the extrusion process often leaves the principal tubing with a cloudy appearance which makes reading of the calibration marks difficult. The assembly of the tip and optional mouthpiece to the tubing constitutes a secondary operation which is costly and time consuming. Further, sonic welds and solvent seals are known to fail in actual use due to a faulty weld or incomplete seal. There are often inaccuracies in measurement due to irregularities inside the tube at the junction of the tip and the tube. In addition, leakage may occur, causing inaccuracies in the volume transmitted. Finally, the tip may even separate from the tube while in use. Such a failure can ruin a test sample, especially in biological applications where samples are limited. In addition, failures of this type can cause a hazard to laboratory personnel where the liquid in the pipette consists of caustic reagents or virulent agents such as AIDS containing samples. Inaccuracies of volume can also result because the extrusion process does not yield a tube having a consistent inner diameter.

SUMMARY OF THE INVENTION

It is therefore an object of this invention to provide an improved pipette of monolithic construction having a tapered tip.

It is a further object of this invention to provide such a pipette having superior visual appearance.

It is a further object of this invention to provide a method of producing such pipettes more quickly and easily than by extrusion molding.

It is a further object of this invention to provide such a pipette which lends itself to simpler manufacture.

It is a further object of this invention to provide such a pipette which is less subject to leaks and failure where the tip meets the tube.

It is a further object of this invention to provide such a pipette having a more uniform internal diameter.

It is a further object of this invention to provide such a pipette which is less expensive to produce.

It is a further object of this invention to provide such a pipette which reduces the risk of inadvertent loss of the sample liquid in the pipette.

It is a further object of this invention to provide such a pipette which reduces the risk of contamination of the work area from accidental loss of sample liquid in the pipette.

It is a further object of this invention to provide such a pipette which reduces the risk of infection of the user from accidental loss of sample liquid in the pipette.

This invention results from the realization that an improved pipette may be produced by forming the tube and tip as a monolithic structure through the use of injection molding, and more particularly from the realization that a more uniform pipette may be produced by stabilizing the core during injection through the use of retractable locking pins.

This invention features a mold having a prolate cavity with a tapered end enclosing an elongated core having a tapered end which together create a tubular space between the mold and the core. A rod extends from the tip of the core to the mold for establishing a hole in the tip of the pipette and for stabilizing the core. The invention also includes at least one pair of movable locking pins for engaging the core and preventing lateral movement of the core during the injection cycle, and drive means for selectively extending the pins into engagement with the core and for retracting the pins. Also included is means for injecting resin into the tubular space in the mold and control means for sequentially operating the drive means to extend and retract the pins as the resin progresses down the core through the mold.

In a preferred embodiment, the cavity, core and resulting tubular space may have tapered ends which are conical and may have cross sections of various configurations including for example circular, square and hexagonal. The mold may include internal or external calibration markings to mark the pipette. There may be two or more pairs of locking pins and paired pins may be diametrically opposed along the core. Pins may be one-eighth inch in diameter and may be at most one half the diameter of the core. The length of the cavity in the core may be at least fifteen times greater than its cross-sectional width.

This invention also features a method for producing an improved pipette including enclosing an elongated core within a mold having a prolate cavity and extending movable paired locking pins into engagement with the core to keep the core from moving. The method further includes injecting resin into the mold and sequentially retracting the locking pins as the resin flows in the cavity to the space near each pair of pins, allowing the resin to cool, opening the mold, removing the core from the mold by actuating a knockout bar which supports the core, and stripping the pipette from the core. The stripper and knockout bar are then retracted and the mold is closed to repeat the process.

In addition, this invention features a pipette made according to the method claimed comprising an elongated tube having a tapered tip formed integrally with the tube. The pipette may have a variety of geometrical cross sectional surfaces including circular, square and hexagonal and the tapered tips may be conical or pyramidal accordingly. The pipette may include calibration markings on its surfaces.

DISCLOSURE OF PREFERRED EMBODIMENT

Other objects, features and advantages will occur from the following description of a preferred embodiment and the accompanying drawings, in which.

This invention may be accomplished with a mold for a pipette which is much longer than it is wide. Since the purpose of pipettes is to allow the user to dispense a known volume of liquid with a significant degree of precision, the volume of a pipette is typically shaped with a height at least one order of magnitude greater than its width. Pipettes are chosen so that their maximum working volumes are roughly equal in magnitude to the largest of the volumes of liquid with which the user will be working. Thus in the range between 0 ml of volume and the full volume of the pipette, an easily discerned deviation in fluid level along the length of the pipette represents a relatively small change in volume of the liquid. In a preferred embodiment the length of the pipette is at least fifteen times greater than the cross-sectional width.

Figure 1:
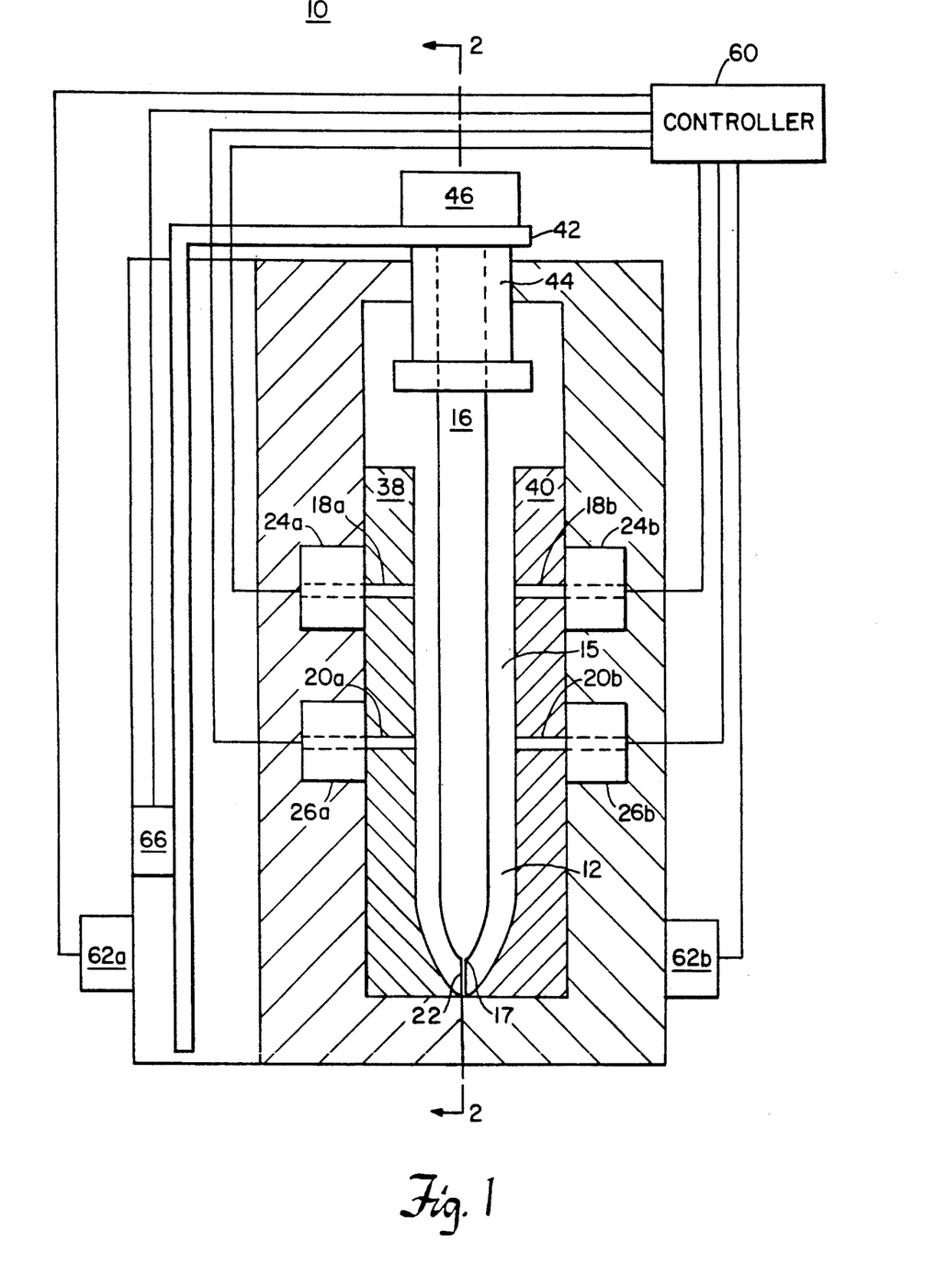
FIG. 1 is a diagrammatic sectional view of a mold system in a closed position according to this invention.

There is shown in FIG. 1, a system according to this invention including mold 10 having prolate cavity 12 with tapered end 14 and surrounding elongate core 16 having tapered end 17, defining tapered tubular space 15 between core 16 and mold 10. Core 16 is suspended from knockout bar 42 which is operated by knockout actuator 66. Knockout bar 42 also carries stripper 44 which is operated by hydraulic cylinder 46 and which surrounds the upper end of core 16. Core 16 is stabilized in cavity 12 by retractable stabilizing pins 18a, 18b and 20a, 20b oriented diametrically about core 16. Pins 18a, 18b and 20a, 20b are actuated by solenoids 24a, 24b and 26a, 26b, respectively. At least two sets of pins and solenoids disposed along the length of the core are used, but in alternative embodiments fewer or more pairs of pins may be used. Locking pins 18, 20 are of equal diameter and the diameter is at most one-half the diameter of core 16. Rod 22 extends from the apex of tapered end 17 of core 16 to the inner surface of mold 10 to further stabilize the tip of the core. Mold 10 may be opened and closed by mold actuators 62a, 62b which separate mold halves 38 and 40 in response to controller 60.

Figure 2:
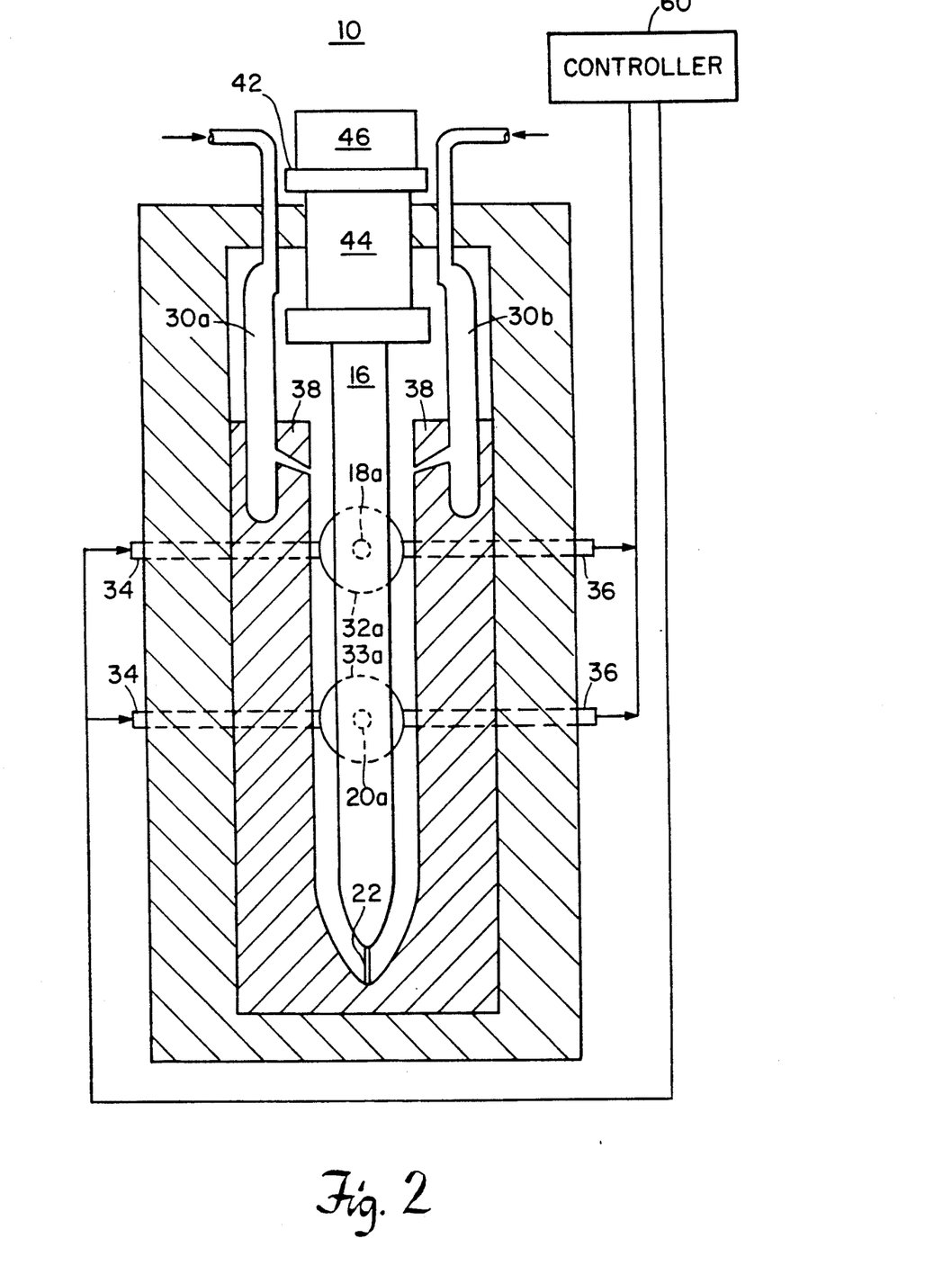
FIG. 2 is a view of the mold system of FIG. 1 taken along line 2—2.

Resin is introduced into the mold by injectors 30a, 30b, FIG. 2. All the operations of this system may be controlled by programmable controller 60 which may include a preset timing program represented by the flow chart of FIG. 5, according to which resin is injected into the mold, pins 18 and 26 are actuated, mold 10 is opened and closed by mold actuators 62, knockout bar 19 is actuated by knockout actuator 66 and stripper 44 is actuated by hydraulic cylinder 46. Actuator means other than solenoids for retracting and extending the pins may be used within the scope of this invention. For example, pins 18a, 18b and 20a, 20b may be actuated by pneumatic cylinders 32a and 32b (not shown), and pneumatic cylinders 33a and 33b (not shown), respectively, which are responsive to air forward input 34 and air backward input 36, both of which may be subject to the control of controller 60.

In operation, resin (not shown) is injected into the mold at the end opposite the tip through injectors 30, FIG. 2. When the resin flows along core 16 to the point where pins 18 rest against core 16, controller 60, FIG. 1 signals solenoids 24 to retract pins 18 so that the resin may flow freely around core 16 at the point where pins 18 had stabilized it. As the resin flows further through the cavity to where pins 20a and 20b, FIG. 1, are located, controller 60 retracts those pins as well. All the pins stabilizing the core are thus retracted as the resin flows to the tapered end of the core. Finally, the cavity is full and resin is allowed to cool.

Figure 3:
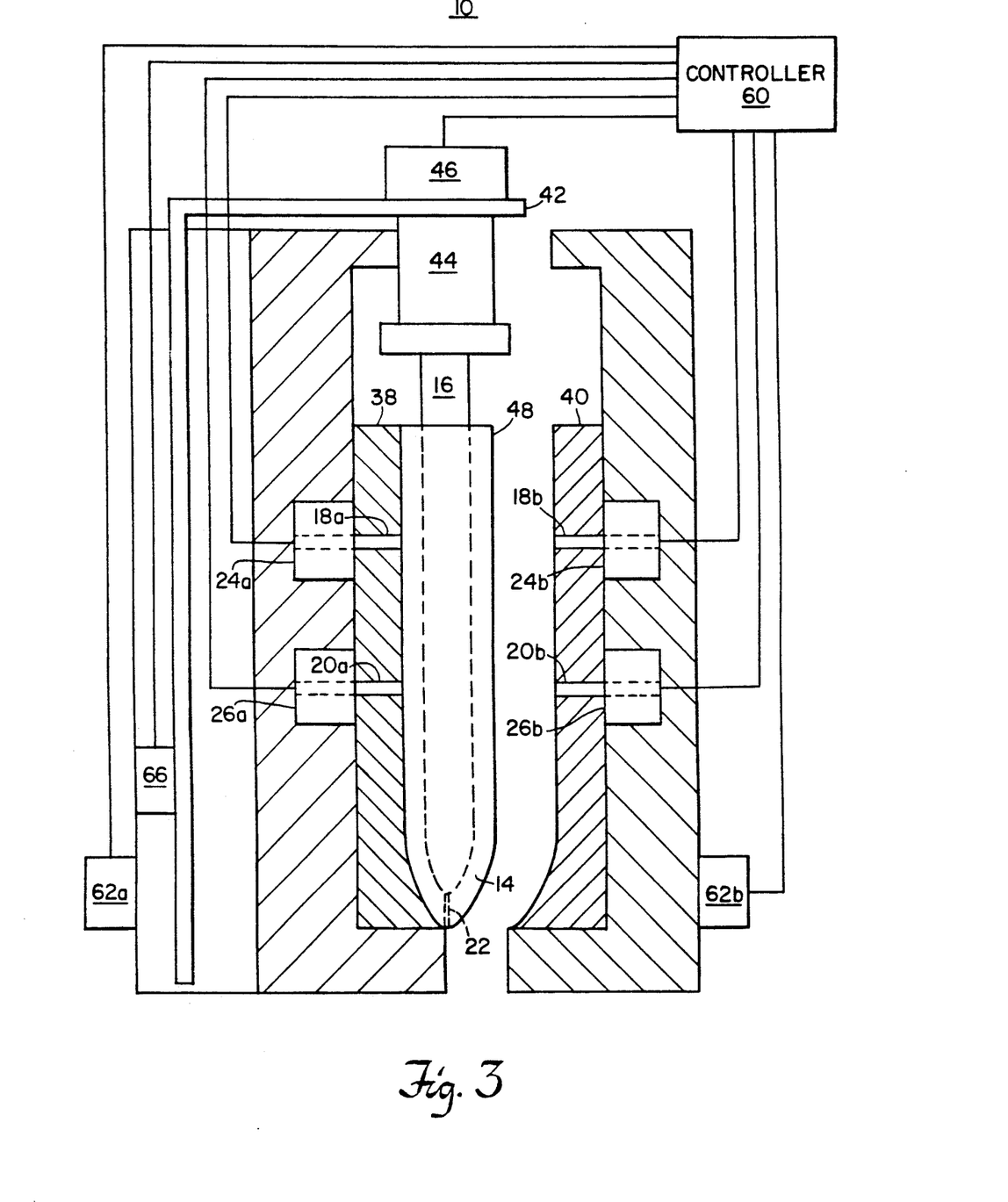
FIG. 3 is a view of the mold of in FIG. 1 in the open position.
Figure 4A:
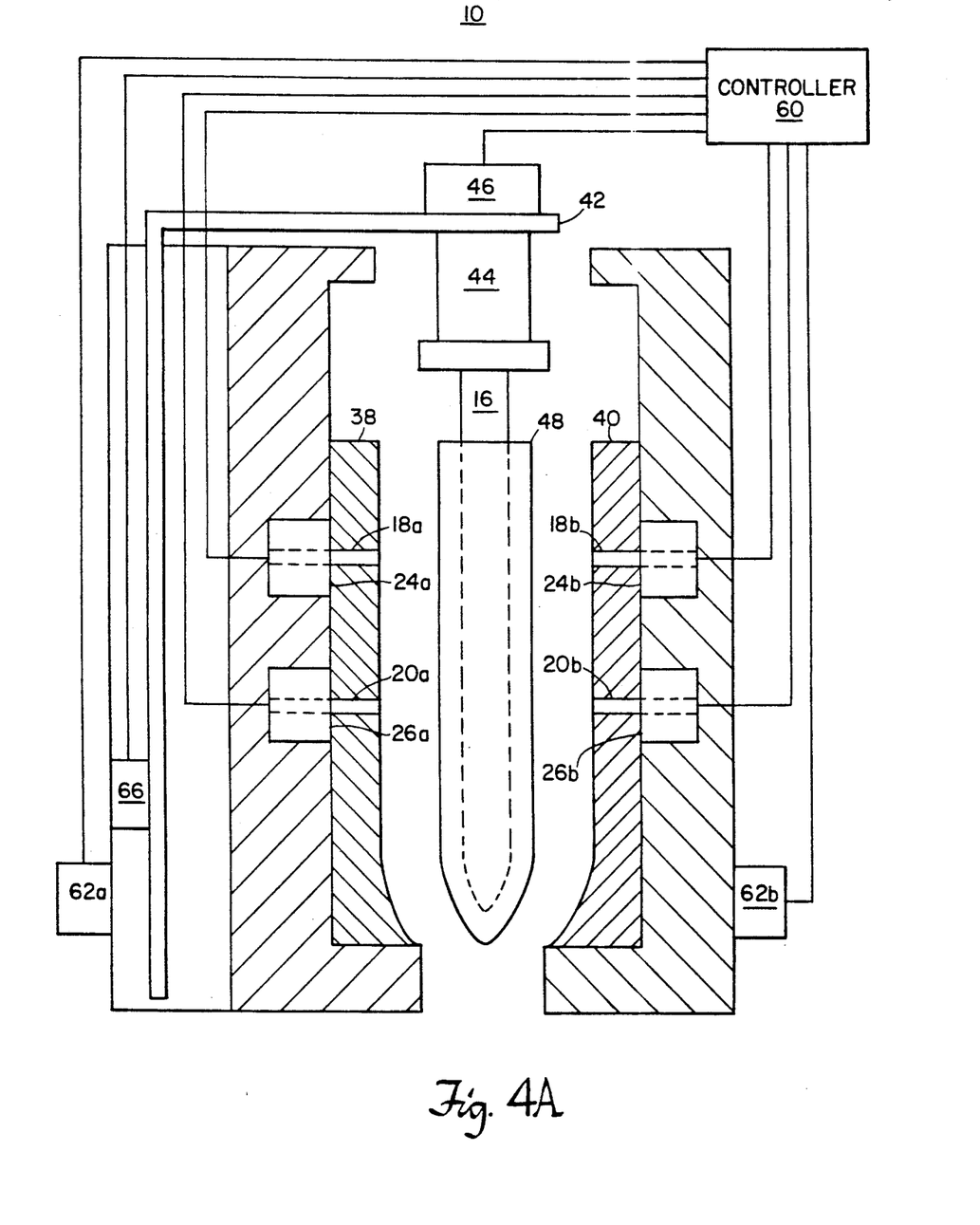
FIG. 4A is a view of the mold of FIG. 3 with the knockout bar in an extended position.
Figure 4B:
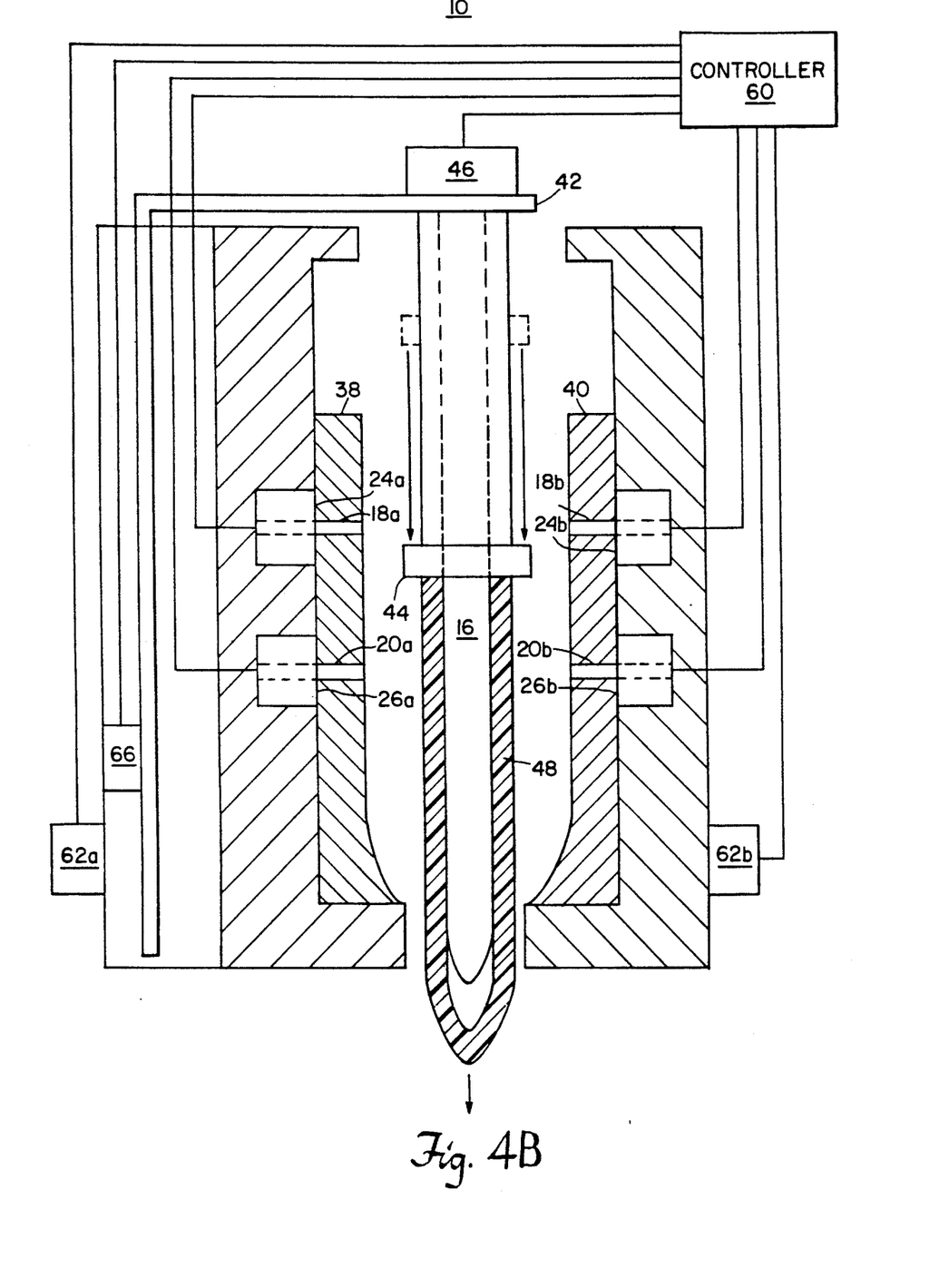
FIG. 4B is a view of the mold of FIG. 4A with the stripper actuated to remove the pipette from the core.

Once the resin has cooled and pipette 48, FIG. 3, is formed, controller 60 activates mold actuator 62 to separate mold half 40 from mold half 38, FIG. 3. Thereafter, controller 60 activates knockout actuator 66 to actuate knockout bar 42, extracting core 16 from mold half 38 as shown in FIG. 4A. Then controller 60 activates hydraulic cylinder 46 to actuate stripper 44, forcing pipette 48 off of rod 16, FIG. 4B. Pipette 48 therefore falls in the direction shown and may be recovered. The mold is then closed into the position shown in FIG. 1, and the process may be repeated.

Figure 5:
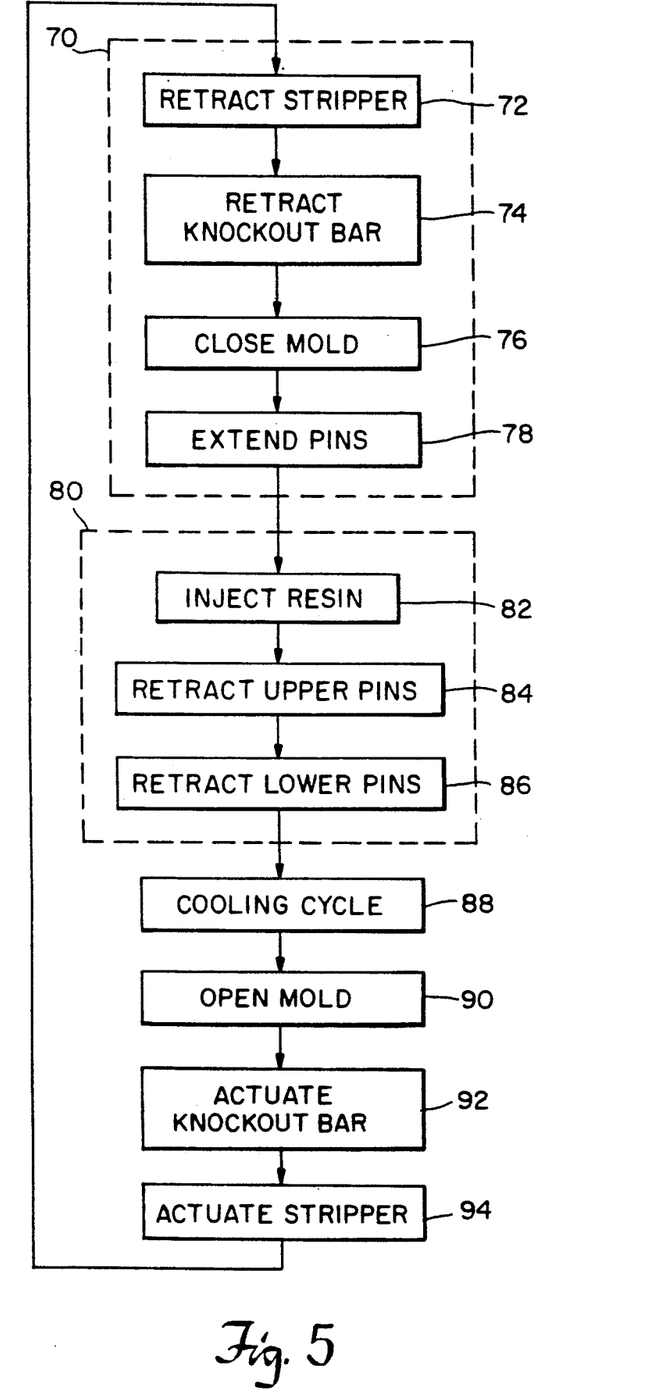
FIG. 5 is a flow chart of the method according to this invention.

FIG. 5 is a flow chart of the operation of the instant invention showing the completion of a cycle, which takes approximately twenty seconds. Preparatory sequence 70, includes step 72 of retracting the stripper, step 74 of retracting the knockout bar, closing the mold 76, and step 78 of extending the locking pins, as in FIG. 3. Preparatory sequence 70 takes about three seconds. Then injection sequence 80 begins, including step 82 of injecting resin into the mold. After approximately half a second, resin has approached the point on the core where the uppermost pair of locking pins is in contact with the core and these pins must be retracted, step 84. When approximately one second has passed, the resin has proceeded to the lower set of locking pins, which are retracted, step 86. After approximately four seconds, resin has filled the cavity, initiating a cooling cycle, step 88, which takes approximately ten seconds. At that point the mold is opened, step 90, as shown in FIG. 3, after which knockout bar 42 is actuated, step 92, to separate the core 16 and pipette 48 from mold half 38, as in FIG. 4. This is accomplished in about one second, after which hydraulic cylinder 46 actuates stripper 44, step 94, to force the pipette off the core for recovery. The process may then be repeated. Timing variations may be accomplished within the scope of the invention by varying such factors as the resin temperature, choice of resin, cooling system for the mold, and the other factors, as is known in the art of injection molding.

Figure 6A:
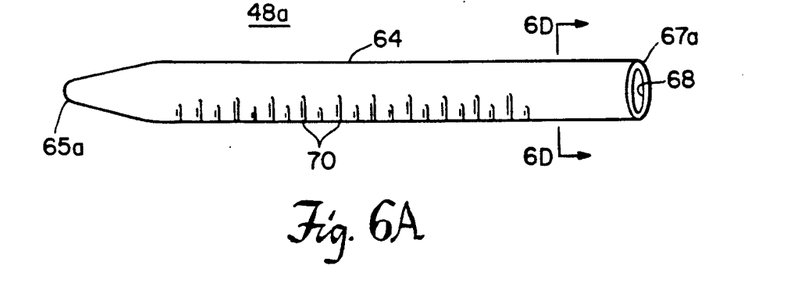
FIG. 6A is a three-dimensional view of a pipette according to this invention having a circular exterior cross section.
Figure 6B:
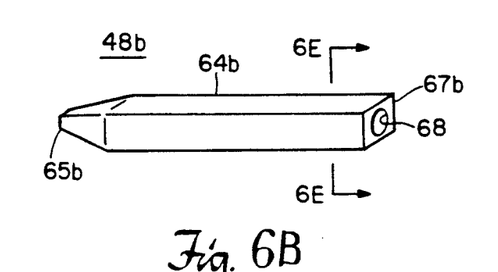
FIG. 6B is a three-dimensional view of a pipette according to this invention having a square exterior cross section.
Figure 6C:
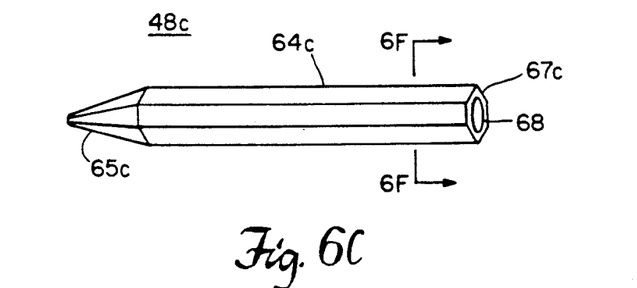
FIG. 6C is a three-dimensional view of a pipette according to this invention have a hexagonal exterior cross section.
Figure 6D:
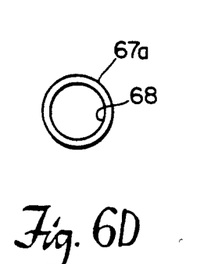
FIG. 6D is a sectional view of the pipette of FIG. 6A taken at line 6D—6D.
Figure 6E:
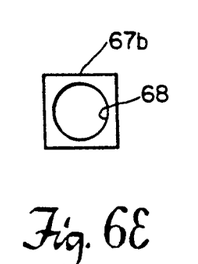
FIG. 6E is a sectional view of the pipette of FIG. 6B taken at line 6E—6E.
Figure 6F:
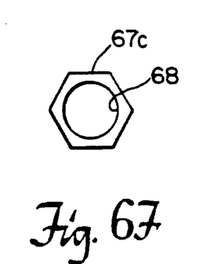
FIG. 6F is a sectional view of the pipette of FIG. 6C taken at line 6F—6F.

FIGS. 6A–6D show a variety of pipettes according to this invention having a cylindrical, square and hexagonal exterior cross-sections 67, respectively. The internal surface cross-section and the external surface cross-section of pipettes according to this invention may be chosen by varying shape of the interior surface of the mold and of the surface of the core, so that internal and external cross-sectional shapes not shown here are within the scope of this invention. FIG. 6A shows pipette 48a having elongate tube 64 including circular interior cross section 68, and circular exterior cross-section 67a, FIG. 6D, conical tapered tip 65a and calibration markings 70 molded onto its side. FIG. 6B shows pipette 48b having a elongate tube 64b with a rectangular exterior cross-section 67b, FIG. 6E, and pyramidal tapered tip 65b. Pipette 48c, FIG. 6C, has elongate tube 64c with a hexagonal exterior cross-section 67c, FIG. 6F, and hexagonal pyramidal tapered tip 65c.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. An injection molding mechanism for forming a monolithic tubular pipette with a tapered tip integrally formed therewith comprising:
    a mold with a prolate cavity having a tapered end;
    an elongated core having a tapered end for residing in said cavity to create a tubular space between the said mold and said core for creating the pipette;
    a rod extending from the tip of said core to the mold for establishing a hole in the tip of the pipette;
    at least one pair of movable locking pins for preventing lateral movement of said core during the injection cycle;
    drive means for selectively extending said pins to engage said core for locking, and for retracting said pins into a recessed position in the wall of said cavity;
    means for injecting a resin into said cavity about said core; and
    control means for sequentially operating said drive means to extend said pins, operating said means for injecting to inject resin into said cavity, and operating said drive means to retract said pins as said resin fills the space proximate to each respective pair of pins.

2. The mechanism of claim 1 in which said tapered ends are conical.

3. The mechanism of claim 1 in which the cavity has a circular cross section.

4. The mechanism of claim 1 in which said cavity has a square cross section.

5. The mechanism of claim 1 in which said cavity has a hexagonal cross section.

6. The mechanism of claim 1 in which said mold includes calibration markings to mark the pipette.

7. The mechanism of claim 1 in which the length of said cavity is at least fifteen (15) times the greatest cross-sectional width of said cavity.

8. The mechanism of claim 1 in which there are two pairs of locking pins.

9. The mechanism of claim 1 in which the pins in said pair are positioned in diametrical opposition along said core.

10. The mechanism of claim 1 in which said pins are one-eighth inch in diameter.

11. The mechanism of claim 1 in which the diameter of said pins is at most one-half the diameter of said core.

12. An injection molding mechanism for forming a monolithic tubular pipette with a tapered tip integrally formed therewith comprising:
    a mold with a prolate cavity having a tapered end;
    an elongated core having a tapered end for residing in said cavity to establish a tubular space between the mold and said core for creating the pipette;
    a rod extending from the tip of said core to the mold for establishing a hole in the tip of the pipette;
    an upper pair of movable locking pins and a lower pair of movable locking pins for preventing lateral movement of said core during the injection cycle;
    drive means for selectively extending said pins to engage said core for locking, and for retracting said pins into a recessed position in the wall of said cavity;
    means for injecting a resin into said cavity about said core; and
    control means for sequentially operating said drive means to extend said upper and lower pins, operating said means for injecting to inject resin into said cavity, and operating said drive means to retract first said upper pins and second said lower pins as said resin fills the space proximate each respective pair of pins.

* * * * *